(12) United States Patent
Wang (10) Patent No.: US 8,695,072 B2
(45) Date of Patent: *Apr. 8, 2014

(54) USER IDENTIFICATION METHOD APPLICABLE TO NETWORK TRANSACTION AND SYSTEM THEREOF

(75) Inventor: Ching-Feng Wang, Taipei (TW)

(73) Assignee: Fonestock Technology Inc., Taipei (TW)

( * ) Notice: Subject to any disclaimer, the term of this patent is extended or adjusted under 35 U.S.C. 154(b) by 297 days.

This patent is subject to a terminal disclaimer.

(21) Appl. No.: 13/308,636

(22) Filed: Dec. 1, 2011

(65) Prior Publication Data

US 2012/0278871 A1 Nov. 1, 2012

(30) Foreign Application Priority Data

Apr. 26, 2011 (TW) .............................. 100114402 A (51) Int. Cl.
- *G06F 21/00* (2013.01)
- *G06F 7/04* (2006.01)
- *G06F 17/30* (2006.01)

(52) U.S. Cl.
USPC ......... 726/7; 705/75; 713/182; 726/6; 726/27

(58) Field of Classification Search
None
See application file for complete search history.

(56) References Cited

U.S. PATENT DOCUMENTS

2004/0243496 A1* 12/2004 Kim et al. ....................... 705/35

OTHER PUBLICATIONS

Steffen Hallsteinsen, Do Van Thanh, Ivar Jorstad, Using the mobile phone as a security token for unified authentication, Second International Conference on System and Networks Communications (ICSNC 2007) 0-7695-2938-0/07 @ 2007 IEEE.*

* cited by examiner

*Primary Examiner* — Philip Chea
*Assistant Examiner* — Fatoumata Traore
(74) *Attorney, Agent, or Firm* — Amin, Turocy & Watson, LLP (57) ABSTRACT

A user identification method and a system thereof. A user device delivers a certificate packet with a unique serial number to a certificate server, and receives a reply packet with a password from a password server. The user device then uses the password and the unique serial number to produce a user terminal identification code, and then delivers an identification packet with the user terminal identification code to the certificate server. After receiving the certificate packet, the certificate server delivers an inquiry packet with the unique serial number to the password server, and then the password server inquires about password and expiration time thereof according to the unique serial number. After receiving the identification packet, the certificate server verifies the validity of the user terminal identification code and the expiration time with a database to determine if the user is admitted to proceed to the subsequent transaction.

14 Claims, 5 Drawing Sheets

| unique serial number | expiration time |
|---|---|
| AAAA | 3 minutes |
| BBBB | 3 minutes |
| CCCC | 3 minutes |
| DDDD | 3 minutes |

FIG. 4A

| unique serial number | password | expiration time |
|---|---|---|
| AAAA | 1234 | 3 minutes |
| BBBB | 2345 | 3 minutes |
| CCCC | 3456 | 3 minutes |
| DDDD | 4567 | 3 minutes |

USER IDENTIFICATION METHOD APPLICABLE TO NETWORK TRANSACTION AND SYSTEM THEREOF

BACKGROUND OF THE INVENTION

1. Field of the Invention

This invention relates to user identification methods and systems thereof, more particularly, to a user identification method applicable to network transaction and a system thereof.

2. Description of Related Art

In a modern network transaction system, if a user's identify is verified to be valid, the user is admitted to proceed with various subsequent transactions. Therefore, the user identification is the most important key in the modern network transaction system. Accordingly, in a network transaction process, it is essentially important to apply secured identity identification mechanism to prevent hackers and impostors from processing various network transactions.

At present, some network transaction systems can produce a one-time password every time a transaction takes place, and for the purpose of enhancing security of the identification mechanism, the one-time password is used as user identification for every transaction. However, in such a mechanism, the one-time password must be changed and then used as the user identification in every transaction, thereby causing inconvenience to the user. Besides, the one-time password is transmitted to the user via a mobile communication network or a telecommunication network. Therefore, there are still opportunities for the hackers to intrude and steal the one-time password in the transmission process and then proceed with the subsequent network transactions.

In view of the above, in the prior network transaction system, a one-time password is mostly used as a user's identification, however causing inconvenience to the user. In addition, since the one-time password is transmitted to the user via a mobile communication network or a telecommunication network, there is a security risk in the transmission process. Hence, it is a highly urgent technique issue in the industry to provide a user identification method applicable to network transaction and system thereof, which enables the user to conveniently process network transaction in an enhanced secured background.

SUMMARY OF THE INVENTION

In view of the drawbacks of the prior art mentioned above, it is therefore an objective of this invention to provide a user identification method applicable to a network transaction, comprising the following steps: having a user device deliver a certificate packet including a unique serial number and/or a user account number of the user device to a certificate server via a first network; having the certificate server deliver an inquiry packet including the unique serial number and/or the user account number to a password server; having the password server inquire about a password and expiration time thereof based on the unique serial number and/or the user account number, and then deliver a reply packet including the password to the user device via a second network; having the user device use the password and the unique serial number to produce a user terminal identification code, and then deliver an identification packet including the user terminal identification code to the certificate server via the first network; and having the certificate server verify the validity of the user terminal identification code and the password with a database, and then determine if a user of the user device is admitted to proceed to subsequent network transaction.

It is a further objective of the present invention to provide a user identification system applicable to network transaction, comprising: a certificate server, which is for delivering and receiving packets and identifying user's identity; a password server, which is for delivering and receiving packets and producing password and service terminal identification code; a database, which is for storing the service terminal identification code and expiration time; and a user device, which is connected to the certificate server and the password server via a first network and a second network, respectively, and is for delivering and receiving packets, wherein the user device has a unique serial number delivers a certificate packet with the unique serial number to the certificate server via the first network, and then the certificate server delivers an inquiry packet with the unique serial number to the password server. Accordingly, the password server inquires about a password and expiration time thereof based on the unique serial number, and then delivers a reply packet with the password to the user device via the second network, thereby enabling the user device to use the password and the unique serial number to produce a user terminal identification code, and then to deliver an identification packet with the user terminal identification code to the certificate server via the first network, and the certificate server verifies with the database if the user terminal identification code matches with the service terminal identification code and if the expiration time is valid.

Compared with the prior technique, in the present invention a password is produced by the password server, and the identification codes are produced based on the unique serial number of the user device. Therefore, within the expiration time, there is no need of changing the password or identification code, thereby providing better convenience to the user; besides, the password and the identification code are delivered via separate networks, thereby providing enhanced security to the user.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention; those in the art can apparently understand these and other advantages and effects after reading the disclosure of this specification. The present invention can also be performed or applied by other different embodiments. The details of the specification may be on the basis of different points and applications, and numerous modifications and variations can be devised without departing from the spirit of the present invention.

Figure 1:
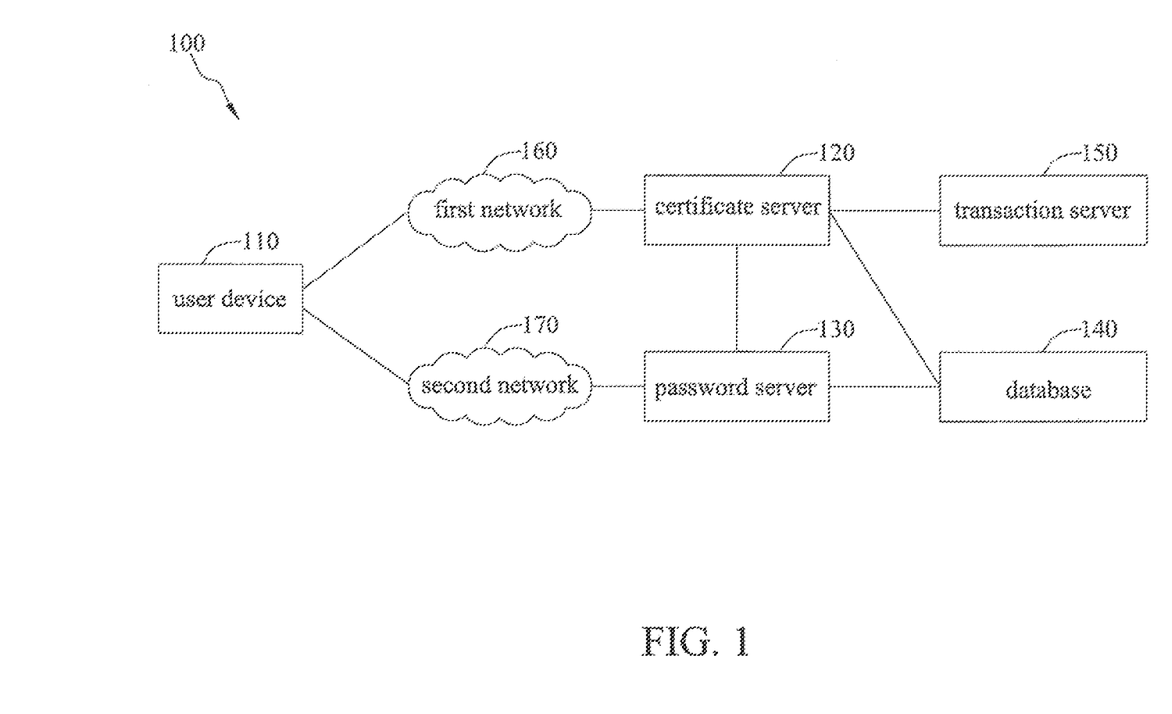
FIG. 1 is a systematic diagram illustrating an embodiment of the user identification system according to the present invention applicable to network transaction.

Referring to FIG. 1, a systematic diagram depicting an embodiment of a user identification system 100 according to the present invention applicable to network transaction is shown.

As shown in FIG. 1, the user identification system 100 of the present invention applicable to network transaction is constructed in networks and has a user device 110, a certificate server 120, a password server 130, and a database 140. The user identification system 100 is for verifying identity of a user using the user device 110, after the user's identity is verified, allowing the user to proceed to network transaction with a transaction background 150. The networks include a first network 160 and a second network 170, wherein the first network 160 can be, e.g., Internet, extranet and/or intranet, while the second network can be, e.g., a mobile communication network and/or telecommunication network, but are not limited to the herein mentioned.

The user device can be any kind of intelligent cellular phone, such as BlackBerry, iPhone, HTC Touch, and etc., but are not limited to the herein mentioned, and the user device 110 has a unique serial number that can be, e.g., International Mobile Equipment Identity Number (IMEI) of the user device, Unique Identification Number (UID) of the user device, Media Access Control address (MAC address) of a wireless network card of the user device, or Central Processing Unit Identification (CPUID) of the user device. Besides, the user device 110 further has a user account number which is corresponding to the user device 110.

The user device 110 is connected to the certificate server 120 and the password server 130 via the first network 160 and the second network 170, respectively, wherein the user device 110 delivers certificate packets and identification packets to the certificate server 120 and receives reply packets from the password server 130, and the certificate server 120 delivers transaction content to the transaction background 150.

The certificate server 120 is for identifying user identity and is for delivering inquiry packets to the password server 130 and receiving certificate packets and identification packets from the user device 110, and also delivering the transaction content to the transaction background 150.

The password server 130 is for producing password and service terminal identification code, and the password server 130 delivers reply packets and receives inquiry packets from the certificate server 120.

The database 140 is for saving the service terminal identification codes and the expiration time.

The transaction background 150 is for receiving the transaction content and, after the certificate server 120 verifies the validity of user identity, admitting the user to use the user device 110 to proceed with transaction based on the received transaction content.

According to the abovementioned, the user device 110 first delivers a certificate packet with the unique serial number to the certificate server 120 via the first network 160, thereby having the unique serial number to be basis of certification. The certificate server 120 delivers an inquiry packet with the unique serial number to the password server 130, thereby making the unique serial number be basis of inquiry. The password server 130 is for inquiring about password and expiration time based on the unique serial number, and the password and the expiration time are saved in the database. Further, the expiration time is for indicating validity of time period of the password, e.g., one-time validity, or validity within three or five minutes The password server 130 is also for inquiring about password and expiration time based on a corresponding relation between the unique serial number and the password. On the other hand, the password server 130 uses the password and the unique serial number to produce a service terminal identification code by means of Hash Algorithm, and then saves the service terminal identification code in the database 140. The password server 130 delivers the reply packets with the password to the user device 110 via the second network 170 so as for the password to be used as the basis of reply. The user device 110 uses the password and the unique serial number to produce a user terminal identification number by means of calculation, e.g. Hash Algorithm, wherein the unique serial number is obtained from the user device 110 itself. The user device 110 delivers the identification packet with the user terminal identification code to the certificate server 120 via the first network 160 so as for the user terminal identification code to be used as the basis of identification, and then delivers transaction content to the certificate server 120. The certificate server 120 uses the service terminal identification code and expiration time saved in the database 140 to verify if the user terminal identification code in the identification packet matches with the service terminal identification code and if the expiration time is valid, and if the user terminal identification code matches with the service terminal identification code and the expiration time is valid, then the certificate server 120 delivers transaction content to the transaction background 150, and the transaction background 150 proceeds to process the transaction content.

Besides, since the user device 110 can have both the unique serial number and the user account number, the certificate packet can also include the unique serial number and the user account number, the inquiry packet can include the unique serial number and user account number, and the password server 130 can inquire about password and expiration time based on the unique serial number and the user account number, thereby enhancing network transaction security.

Figure 2:
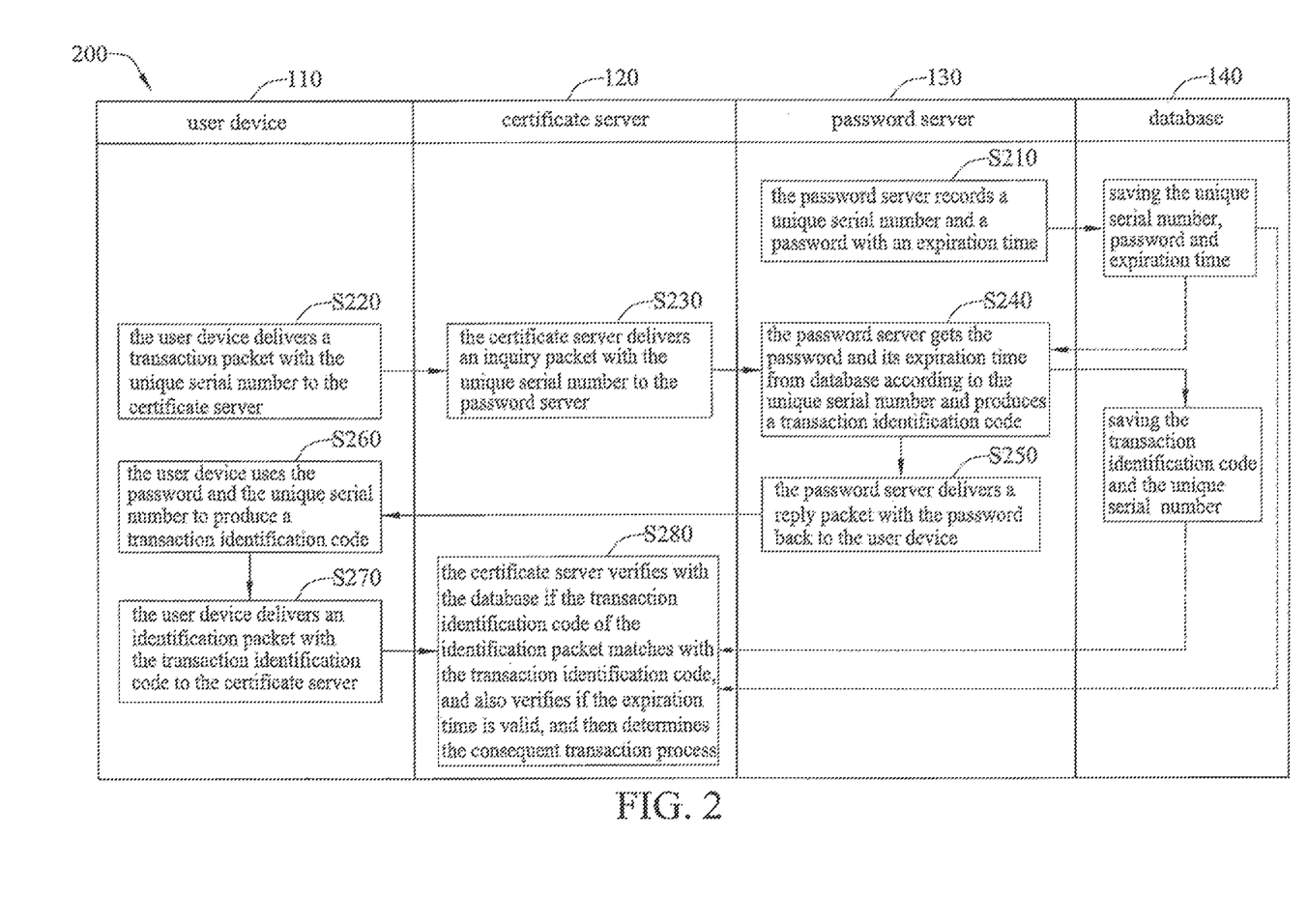
FIG. 2 is a flowchart depicting an embodiment of the user identification method according to the present invention applicable to network transaction.

In accordance with FIG. 1, FIG. 2 is a flowchart showing an embodiment of the user identification method 200 according to the present invention applicable to network transaction. As shown in FIG. 2, the user device 110, the certificate server 120, the password server 130, the database 140, and etc. are for processing the following steps in a configuration mode.

As shown in FIG. 2, in step S210, the password server 130 records a unique serial number so as to set up a password and an expiration time thereof corresponding to the unique serial number. Next, the method proceeds to step S220.

It should be noted herein, before a user wants to start using a network transaction via the user identification method of the present invention applicable to network transaction, the user must carry out a registration procedure. More particularly, the user can register the unique serial number by visiting at a service terminal providing the network transaction, and the registration can be carried out at the first time the user starts using the network transaction or when the user is replacing with a new user device 110. By means of the registration procedure, the service terminal pre-saves the unique serial number and a corresponding password and an expiration time thereof in the database 140, thereby providing subsequent user identification, as described in following steps S220 through S280.

In step S220, the user device 110 delivers a certificate packet with the unique serial number to the certificate server 120 via a first network 160. Next, proceed to step S230.

In step S230, the certificate server 120 delivers an inquiry packet with the unique serial number to the password server 130. Next, proceed to step S240.

In step S240, the password server 130 inquiries the database 140 about password and expiration time based on the unique serial number. It should be noted herein that, if a password corresponding to the unique serial number does not exist or the expiration time is invalid, the password server produces another set of password, e.g. password generated by random number, and then saves the password and expiration time corresponding to the unique serial number in the database 140. Also, the password server 130 uses the password and the unique serial number to produce a service terminal identification code by means of Hash Algorithm, and then saves the service terminal identification code and the expiration time in the database 140. Next, proceed to step S250.

In step S250, the password server 130 delivers a reply packet with the password to the user device 110 via a second network 170. Next, proceed to step S260.

In step S260, the user device 110 uses the password and the unique serial number to produce a user terminal identification code, wherein the user device applies Hash Algorithm to produce the user terminal identification code. Next, proceed to step S270, In step S270, the user device 110 delivers an identification packet with the user terminal identification to the certificate server 120 via the first network 160, wherein the user device 110 further delivers transaction content to the certificate server 120 via the first network 160. Next, proceed to step S280.

In step S280, the certificate server 120 verifies the validity of the user terminal identification code and expiration time of the identification packet with the service terminal identification code and expiration time stored in the database 140. After having verified the two identification codes are matched and the expiration time is valid, the certificate server 120 delivers the transaction content to a transaction background 150, for the transaction background 150 to thereby execute the transaction content. Otherwise, after having verified the two identification codes are not matched or the expiration time is invalid, the certificate server 120 stops delivering the transaction content.

Figure 3:
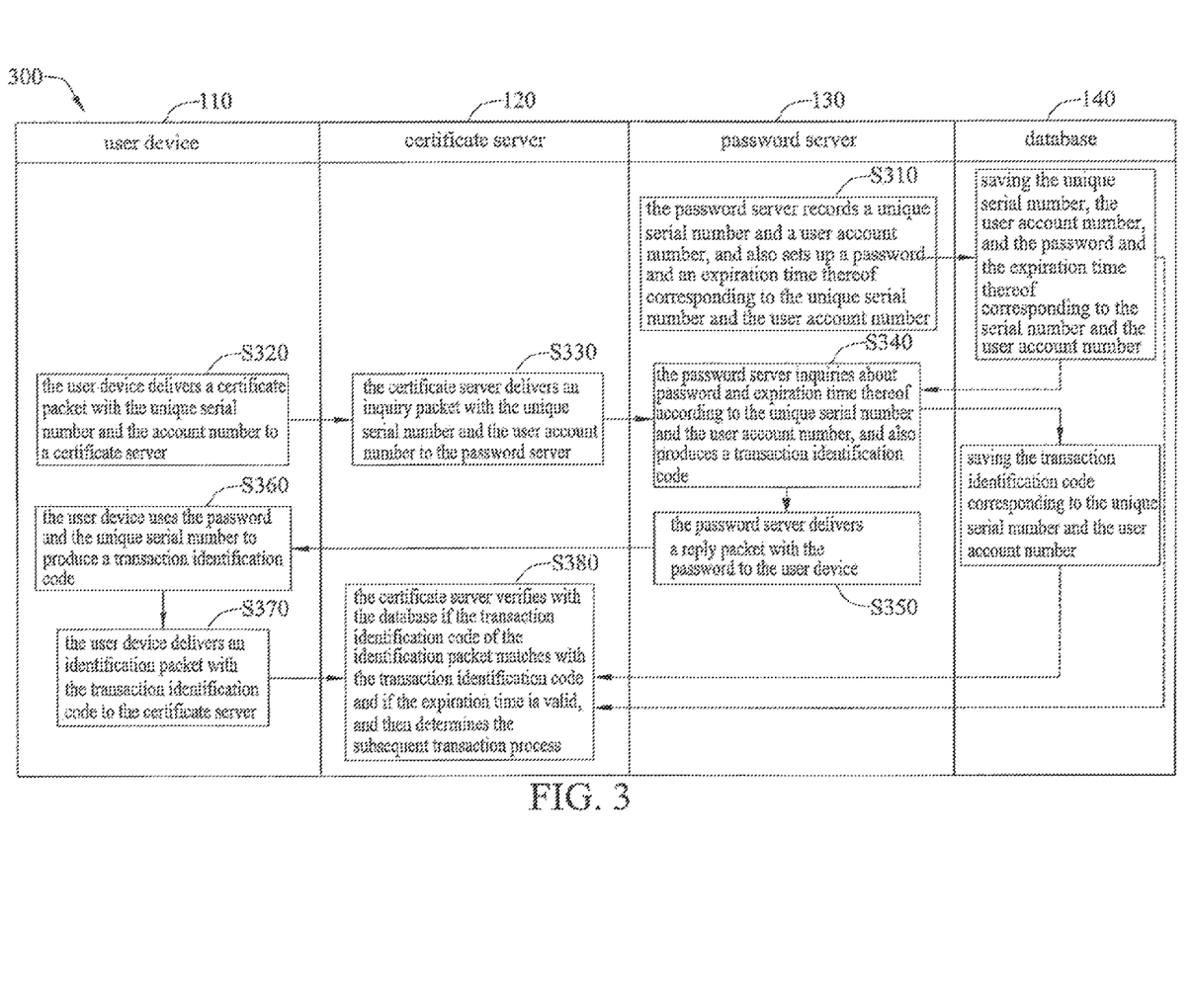
FIG. 3 is a flowchart depicting another embodiment of the user identification method according to the present invention applicable to network transaction.

Furthermore, in accordance with FIG. 1, FIG. 3 is a flowchart showing another embodiment of the user identification method 300 of the present invention applicable to network transaction. As shown in FIG. 3, the user device 110, the certificate server 120, the password server 130, the database 140, and etc., are for processing the following steps in a configuration mode.

As shown in FIG. 3, in step S310, the password server 130 records a unique serial number and a user account number so as to sep up a password and expiration time thereof corresponding to the unique serial number and the user account number. Next, proceed to step S320.

Same as in step S210, a registration procedure enables a service terminal that provides network transaction to pre-save the unique serial number, the user account number, and corresponding password and expiration time thereof in the database, to thereby provide for subsequent user identification. It should be noted herein that, compared with FIG. 2, the registration time of the present embodiment further includes a time when the user changes the user account number corresponding to cell phone number registered by the user.

In step S320, the user device 110 delivers a certificate packet with the unique serial number and the user account number to the certificate server 120 via a first network 160. Next, proceed to step S330.

In step S330, the certificate server 120 delivers an inquiry packet with the unique serial number and the user account number to the password server 130. Next, proceed to step S340.

In step S340, the password server 130 inquires the database 140 about password and expiration time based on the unique serial number and the user account number, same as mentioned in step S240, if a password corresponding to the unique serial number and the user account number does not exist or the expiration time is invalid, the password server 130 produces another set of password, e.g. a password produced by random number, and then saves the password and expiration time corresponding to the unique serial number and the user account number in the database 140. The password server 130 further uses the password and the unique serial number to produce a service terminal identification code, e.g. an identification code produced by means of Hash Algorithm, and then saves the service terminal identification code and the expiration time in the database 140. Next, proceed to step S350. In step S350, the password server 130 delivers a reply packet with the password to the user device 110 via a second network 170. Next, proceed to step S360.

In step S360, the user device 110 uses the password and the unique serial number to produce a user terminal identification code by means of Hash Algorithm. Next, proceed to step S370.

In step S370, the user device 110 delivers an identification packet with the user terminal identification code to the certificate server 120 via the first network 160, wherein the user device 110 further delivers a transaction content to the certificate server 120 via the first network 160. Next, proceed to step S380.

In step S380, the certificate server 120 verifies with the database 140 if the user terminal identification code of the identification packet matches with the service terminal identification code and if the expiration time is valid, for further determining subsequent transaction steps. If that the two identification codes are matched and the expiration time is valid has been verified, the certificate server 120 delivers the transaction content to a transaction background 150, for the transaction background 150 to execute the transaction content. Otherwise, if that the two identification codes are not matched or the expiration time is invalid has been verified, the certificate server 120 stops delivering the transaction content.

Figure 4A:
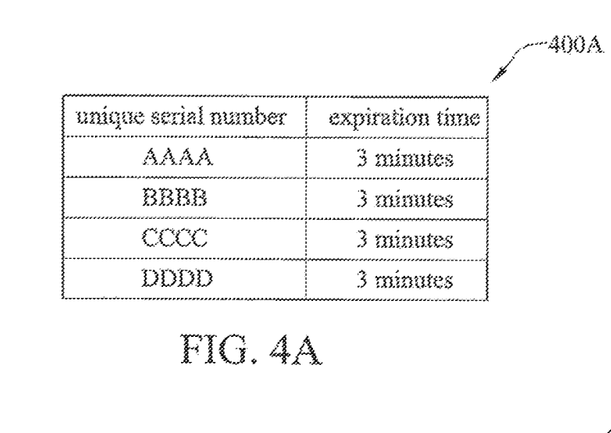
FIG. 4A is a corresponding relation table of unique serial number and expiration time pre-saved in a database according to the user identification method according to the present invention applicable to network transaction and system thereof.
Figure 4B:
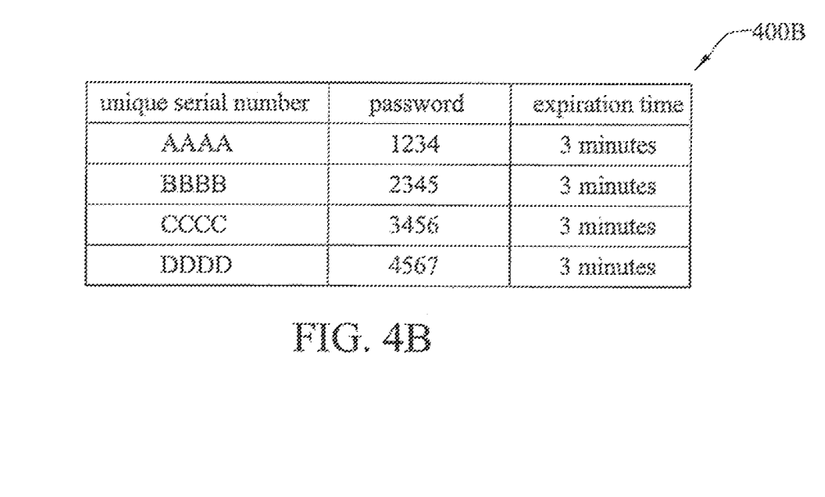
FIG. 4B is a corresponding relation table of unique serial number, password, and expiration time pre-saved in the database according to the user identification method according to the present invention applicable to network transaction and system thereof.
Figure 5:
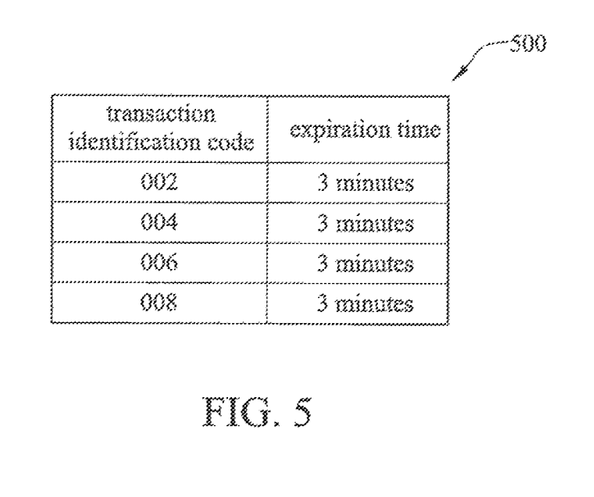
FIG. 5 is a corresponding relation table of identification code and expiration time pre-saved in the database according to the user identification method according to the present invention applicable to network transaction and system thereof.

Referring to FIGS. 4A, 4B, and 5, an embodiment of how to produce a password based on a unique serial number pre-saved in the database according to the user identification method of the present invention applicable to network transaction and system thereof is shown. This embodiment is only an example, and is not limited to the specifications herein.

According to the aforesaid, before a user starts using a network transaction via the user identification method of the present invention applicable to network transaction and system thereof, the user must carry out a registration procedure, namely, at the time the user first starts using the network transaction service, replacing with a new cell phone, changing user account number of the cell phone number registered by the user, the user must record a unique serial number and/or user account number of the user's cell phone via administrator capable of accessing to the password server, making required changes, and setting up expiration time as well, e.g., one-time validity, or validity within three or five minutes, as shown in FIG. 4A, which is a corresponding relation table 400A of unique serial number and expiration time.

Next, when a user is to process a network transaction, the user logs in a network transaction system and clicks on option of network transaction, at this moment, the user uses his/her cell phone to deliver a certificate packet including a unique serial number, e.g. AAAA, and/or user account number of the user's cell phone to a certificate server via the Internet.

After that, the certificate server delivers an inquiry packet including the unique serial number, e.g. AAAA, and/or user account number of the user's cell phone to the password server. Then, the password server inquiries about password and expiration time based on the unique serial number and/or user account number. If the password corresponding to the unique serial number does not exist, the password server produces a password by using random number, and then updates and saves the password and expiration time corresponding to the unique serial number in the database, as shown in FIG. 4B, which is a corresponding relation table of unique serial number, password, and expiration time.

Besides, if the expiration time of the password corresponding to the unique serial number is expired, e.g. exceeding 3 minutes, the password server uses random number to produce a password, and then updates and saves the password and expiration time corresponding to the unique serial number in the database.

Furthermore, after updating and saving the password and the expiration time thereof corresponding to the unique serial number in the database, the password server uses the password and the unique serial number, e.g. unique serial number AAAA and password 1234, to produce a service terminal identification code by means of Hash Algorithm, e.g. service terminal identification code 002, and then saves the identification code and the expiration time in the database, as shown in FIG. 5, which is a corresponding relation table 500 of identification code and expiration time.

Afterward, the password server delivers a reply packet with the password, e.g. password 1234, to the user's cell phone via a mobile communication network. Next, the user's cell phone uses the password and the unique serial number to produce a user terminal identification code, e.g. user terminal identification code 002, by means of Hash Algorithm.

Subsequently, the user's cell phone delivers an identification packet including the user terminal identification code, namely, the user terminal identification code 002, to the certificate server via the Internet, and the user's cell phone further delivers a transaction content to the certificate server via the Internet.

Accordingly, the certificate server verifies the validity of the user terminal identification code of the identification packet and the expiration time with the service terminal identification code and expiration time saved in the database. If the user terminal identification code matches with the service terminal identification code and the expiration time is valid as well, the certificate server delivers the transaction content to a transaction background, and then the transaction background executes the transaction content; otherwise, if the user terminal identification code does not match with the service terminal identification code or the expiration time is invalid, the certificate server stops delivering the transaction content.

In view of the above, the present invention provides a user identification method applicable to network transaction and system thereof, mainly producing a password by a password server, as well as producing a user terminal identification code by using a unique serial number of the user device. Accordingly, there is no need of changing the password and the user terminal identification code within an expiration time, thereby providing better convenience to users; in addition, the present invention applies two separate networks to deliver the password and the user terminal identification code, thereby providing enhanced security to users.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A user identification method applicable to a network transaction, comprising the following steps of:
   (1) delivering a certificate packet by a user device to a certificate server via a first network, the certificate packet including a unique serial number of the user device;
   (2) delivering an inquiry packet by the certificate server to a password server, the inquiry packet including the unique serial number;
   (3) inquiring a database by the password server about a password and expiration time thereof based on the unique serial number;
   (4) delivering a reply packet by the password server to the user device via a second network, the reply packet including the password;
   (5) using the password and the unique serial number by the user device to produce a user terminal identification code;
   (6) delivering an identification packet by the user device to the certificate server via the first network, the identification packet including the user terminal identification code; and
   (7) verifying by the certificate server validity of the user terminal identification code and expiration time thereof with the database, and then determining if a user of the user device is admitted to proceed a subsequent transaction;
   wherein in step (3), when a corresponding password of the unique serial number does not exist or the expiration time is invalid, the following steps are executed:
   (3.1) producing the password by the password server, and then saving the password and the expiration time thereof corresponding to the unique serial number in the database; and
   (3-2) using the password and the unique serial number by the password server to produce a service terminal identification code, and then saving the service terminal identification code and the expiration time in the database.

2. The user identification method of claim 1, wherein the unique serial number is an International Mobile Equipment Identity Number (IMEI), Unique Identification Number (UID), Media Access Control address (MAC address), or Central Processing Unit Identification (CPUID).

3. The user identification method of claim 1, wherein step (6) further comprises delivering transaction content by the user device to the certificate server via the first network.

4. The user identification method of claim 3, wherein step (7) further comprises, after having verified the user terminal identification code and the expiration time are valid, delivering the transaction content by the certificate server to a transaction background, and, subsequently, proceeding by the transaction background to a transaction process based on the transaction content.

5. The user identification method of claim 3, wherein step (7) further comprises, after having verified the user terminal identification code or the expiration time is invalid, stopping delivering the transaction content by the certificate server.

6. The user identification method of claim 5, prior to step (1), further comprising:
   (1-1) recording the unique serial number by the password server, and setting up a password corresponding to the unique serial number and an expiration time thereof; and
   (1-2) using the password and the unique serial number by the password server to produce a service terminal identification code, and then saving the service terminal identification code and the expiration time; so as to in step (7), enable the certificate service to verify the validity of the user terminal identification code according to the result of matching the user terminal identification code with the service terminal identification code.

7. The user identification method of claim 6, wherein the certificate packet in step (1) and the inquiry packet in step (2) further comprise a user account number, and in step (3), the password server uses the unique serial number and the user account number to inquire the database about corresponding password and expiration time thereof.

8. The user identification method of claim 7, wherein prior to step (1), the password server records the unique serial number and the user account number, and sets up a password and an expiration time thereof corresponding to the unique serial number and the user account number.

9. The user identification method of claim 1, wherein prior to step (1), the password server records the unique serial number, and sets up a password and an expiration time thereof corresponding to the unique serial number.

10. The user identification method of claim 1, wherein the certificate packet in step (1) and the inquiry packet in step (2) further comprise a user account number, and in step (3), the password server inquires the database about password and expiration time thereof corresponding to the unique serial number and the user account number.

11. The user identification method of claim 10, wherein prior to step (1), the password server records the unique serial number and the user account number, and uses the unique serial number and the user account number to set up a corresponding password and an expiration time thereof.

12. A user identification system applicable to a network transaction, comprising;
   a certificate server for delivering and receiving packets, and for identifying user identity;
   a password server for delivering and receiving packets, and for producing password and service terminal identification code;
   a database for saving the service terminal identification code and expiration time; and
   a user device connected to the certificate server and the password server via a first network and a second network, and for delivering and receiving packets, and having a unique serial number, wherein the user device delivers a certificate packet with the unique serial number to the certificate server via the first network, and then the certificate server delivers an inquiry packet with the unique serial number to the password server; the password server inquires about the password and expiration time thereof based on the unique serial number, and then delivers a reply packet with the password to the user device via the second network, thereby enabling the user device to produce a user terminal identification code by using the password and the unique serial number, and further to deliver an identification packet with the user terminal identification code to the certificate server via the first network, and the certificate server verifies with the database if the user terminal identification code matches with the service terminal identification code and if the expiration time is valid, and wherein when a corresponding password of the unique serial number does not exist or the expiration time is invalid, the password server produces the password and saves the password and the expiration time thereof corresponding to the unique serial number in the database, and then the password server uses the password and the unique serial number to produce a service terminal identification code, and saves the service terminal identification code and the expiration time in the database.

13. The user identification system of claim 12, wherein the unique serial number is an International Mobile Equipment Identity Number (IMEI), Unique Identification Number (UID), Media Access Control address (MAC address), or Central Processing Unit Identification (CPUID).

14. The user identification system of claim 13, wherein the user device is further provided with a user account number, such that the certificate packet and the inquiry packet further include the user account number, and the password server inquires about password and expiration time thereof based on the unique serial number and the user account number.

* * * * *